Patented Feb. 27, 1951

2,543,267

UNITED STATES PATENT OFFICE 2,543,267

HYDROXYETHYL-ACYLAMIDO-BIPHENYLYL KETONES

Louis L. Bambas, Grosse Pointe Woods, Mich., assignor to Parke, Davis & Company, Detroit, Mich., a corporation of Michigan No Drawing. Application January 4, 1950, Serial No. 136,833

8 Claims. (Cl. 260—558)

This application is a continuation in part of my co-pending application, Serial Number 83,778, filed March 26, 1949, now U. S. Patent 2,516,098, and the invention relates to keto-amido alcohols and to methods for obtaining the same. More particularly, the invention relates to biphenylyl-α-acylamido-β-hydroxyethyl ketones of the formula,

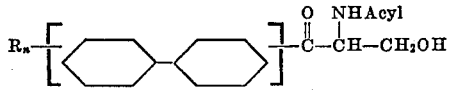

where $n$ is 1 or 2, and R is the same or different and represents hydrogen, halogen, nitro, lower alkyl, or lower alkoxy radicals. The term "acyl" as used herein includes saturated and unsaturated lower aliphatic acyl, halogen, substituted lower aliphatic acyl, carboxy substituted lower aliphatic acyl, cyano substituted lower aliphatic acyl, ether substituted lower aliphatic acyl, hydroxy substituted lower aliphatic acyl, ester substituted lower aliphatic acyl, benzoyl, substituted benzoyl, araliphatic acyl, furoyl, pyridinoyl and the like radicals.

In accordance with the invention, biphenylyl α-acylamido-β-hydroxyethyl ketones having the above formula are obtained by condensing biphenylyl acylamidomethyl ketones of the formula,

with formaldehyde in the presence of an alkaline condensation catalyst, where R and $n$ have the same significance as given above.

In carrying out this condensation, the formaldehyde may be supplied to the reaction mixture in a number of different forms. For example, formaldehyde gas, aqueous or alcoholic solutions of formaldehyde, paraformaldehyde and other formaldehyde-yielding polymers may be used. In most cases it has been found preferable to use an excess of formaldehyde, usually up to about four or five moles, in order to insure completeness of the condensation reaction.

A variety of solvents, alkaline condensation catalysts, and reaction conditions may also be employed. As solvents, either aqueous or anhydrous lower aliphatic alcohols are particularly advantageous, but moist dialkyl ethers and dioxane-water mixtures may also be used. The alkaline condensation catalysts used in this phase of the invention may be organic bases, inorganic bases, or inorganic salts of acidic or pseudo acidic organic compounds. Some representative types of these catalysts are the hydroxides, oxides, carbonates, bicarbonates, and amides of alkali or alkali earth metals, alkali metal alkoxides, alkali earth alkoxides, alkali metal phenolates, alkali metal salts of lower aliphatic carboxylic acids, organic tertiary amines and quaternary ammonium hydroxides of organic tertiary amines. In general, the weakly alkaline catalysts, such as sodium bicarbonate, potassium bicarbonate, calcium hydroxide, pyridine, triethyl amine, N-ethyl morpholine, N,N-dimethyl aniline, and the like are preferred. They make the reaction much easier to control. When strongly alkaline catalysts, such as sodium hydroxide, potassium hydroxide, potassium carbonate, sodium methylate, sodium ethylate, and the like are used, care must be taken to remove or inactivate the catalyst as soon as the reaction is completed in order to prevent conversion of the desired product to the corresponding methylene bis compound by dehydration and coupling reaction. Although the amount of catalyst is not critical and can vary from a few hundredths or thousandths of a mole to one mole or more, it is preferable from the standpoint of yield to use only enough to bring about a relatively rapid reaction. In most cases 0.05 mole or less is sufficient.

The temperature used in carrying out this methylolation reaction as well as the time required for its completion varies with the catalyst used. In general, the reaction can be carried out at a temperature between 0° and 75° C. in a time varying from a few minutes to several hours. When strongly alkaline catalysts are used, the reaction proceeds very rapidly and is usually complete in a few minutes at room temperature or below. However, when mildly alkaline catalysts are employed, the reaction is not so rapid and usually requires from 15 minutes to several hours at room temperature or slightly above, that is, at about 25–50° C.

The products of the invention are useful as intermediates in the preparation of other organic compounds. They are of particular value in the preparation of organic compounds possessing antibiotic activity against micro-organisms of the Rickettsia type.

The invention is illustrated by the following examples:

Example 1

58 g. of 4-biphenylyl acetamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4-biphenylyl α-acetamido-β-hydroxyethyl ketone of formula,

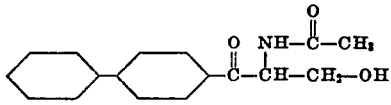

is collected and purified by recrystallization from ethyl acetate; M. P. 166–7° C.

*Example 2*

A mixture consisting of 31.5 g. of 3-biphenylyl benzamidomethyl ketone, 1 g. of sodium bicarbonate and 6 g. of paraformaldehyde in 300 cc. of methanol is warmed at 45 to 50° C. for one-half hour. The reaction mixture is allowed to stand for one hour and then poured into 1.5 liters of ice water. The precipitated product is collected, washed with water and purified by recrystallization from ethel acetate or ethanol to obtain the pure 3-biphenylyl α - benzamido - β - hydroxyethyl ketone of formula,

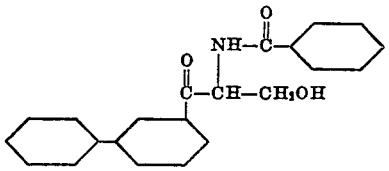

*Example 3*

A mixture consisting of 25 g. of 4'-methoxy-4 biphenylyl phenylacetamidomethyl ketone, 0.2 g. of sodium bicarbonate and 6 g. of paraformaldehyde in 500 cc. of methanol is heated at 40° C. for about twenty minutes with stirring and then poured into 1500 cc. of ice water. The crude 4'-methoxy-4 - biphenylyl α - phenylacetamido - β - hydroxyethyl ketone which separates is collected, washed with water and purified by recrystallization from alcohol. The formula of this product is,

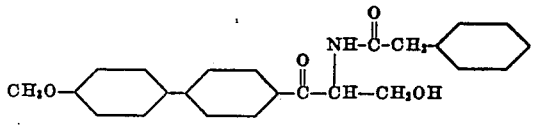

*Example 4*

2 g. of sodium bicarbonate is added to a solution of 50 g. of 4'-nitro-4-biphenylyl acetamidomethyl ketone and 75 cc. of 40% neutral formalin in 450 cc. of methanol and the resulting mixture heated at 45 to 50° C. for about one-half hour. The reaction mixture is poured into 1.5 liters of ice water and the crude 4'-nitro-4-biphenylyl α-acetamido-β-hydroxyethyl ketone which separates collected and washed with water. If desired, this product can be purified by recrystallization from methanol. Its formula is,

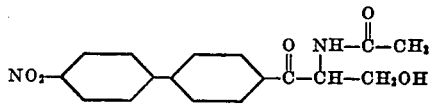

*Example 5*

33 g. of 4'-iodo-4-biphenylyl benzamidomethyl ketone is mixed with 250 cc. of absolute methanol and 30 cc. of 38% aqueous formaldehyde. 0.6 g. of sodium bicarbonate is added and the mixture stirred at 35° C. for 1.5 hours during which time the solid product separates. The mixture is cooled, stirred for a short time and the solid 4'-iodo-4-biphenylyl α-benzamido - β - hydroxyethyl ketone collected, washed with water and dried. This product has the formula,

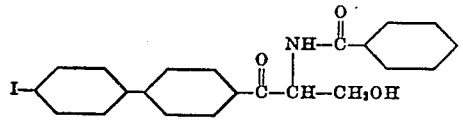

*Example 6*

A mixture consisting of 65 g. of 2'-methyl-4-biphenylyl-p-toluylamidomethyl ketone, 300 cc. of ethanol and 75 cc. of 40% neutral formalin is treated with 2 g. of sodium bicarbonate. The mixture is stirred at 35° C. for about one and one-half hours, cooled and the insoluble 2'-methyl-4-biphenylyl α-(p-toluylamido)-β - hydroxyethyl ketone collected. This product which has the formula,

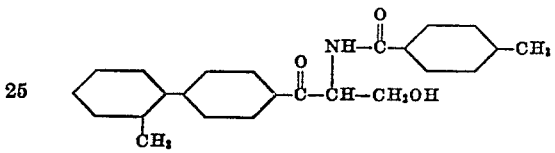

is washed with water and dried in vacuo.

*Example 7*

A mixture consisting of 65 g. of 4'-nitro-6-methyl - 3 - biphenylyl acetamidomethyl ketone, 350 cc. of methanol, 75 cc. of 40% neutral formalin and 2 g. of sodium bicarbonate is stirred for about two hours at room temperature. The solution is cooled and the 4'-nitro-6-methyl-3-biphenylyl-α-acetamido-β-hydroxyethyl ketone collected, washed with a small amount of methanol and purified by recrystallization from ethyl acetate or methanol. The formula of this product is,

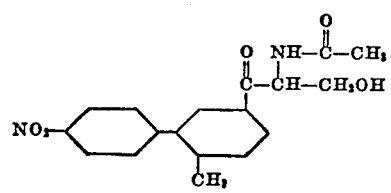

*Example 8*

2 g. of sodium bicarbonate is added to a solution of 50 g. of 4'-nitro-4-biphenylyl dichloroacetamidomethyl ketone and 75 cc. of 40% neutral formalin in 480 cc. of methanol and the resulting mixture is heated at 45–50° C. for about one-half hour. The reaction mixture is poured into 1.5 liters of ice water and the crude 4'-nitro-4-biphenylyl α-dichloroacetamido-β - hydroxyethyl ketone which separates is collected and washed with water. If desired, this product can be purified by recrystallization from methanol. Its formula is,

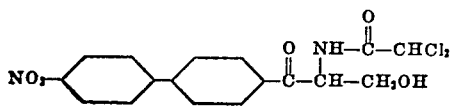

*Example 9*

0.2 g. of sodium bicarbonate is added to a solution of 6 g. of 4'-nitro-4-biphenylyl fluoroacetamidomethyl ketone and 7.5 cc. of 40% neutral formalin in 50 cc. of methanol and the resulting mixture heated at 50° C. for about one-half hour.

The reaction mixture is poured into 200 cc. of ice water and the crude 4'-nitro-4-biphenylyl α-fluoroacetamido-β-hydroxyethyl ketone which separates is collected and washed with water. This product is purified by recrystallization from methanol and has the formula,

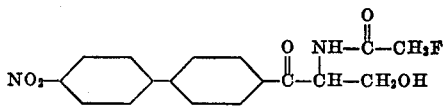

*Example 10*

A mixture consisting of 27 g. of 3'-ethyl-3-biphenylyl cyanoacetamidomethyl ketone, 1 g. of sodium bicarbonate and 6 g. of paraformaldehyde in 300 cc. of methanol is warmed at 45° C. for one-half hour. The reaction mixture is allowed to stand for one-half hour and is then poured into 1.5 liters of ice-water. The precipitated product is collected, washed with water and purified by recrystallization from ethyl acetate to obtain the pure 3'-ethyl-3-biphenylyl α-cyanoacetamido-β-hydroxyethyl ketone of the formula,

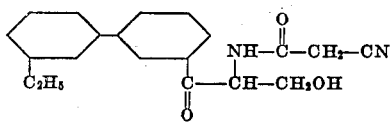

*Example 11*

3.3 g. of 2-ethyl-4-biphenylyl acetoxyacetamidomethyl ketone is mixed with 30 cc. of absolute methanol and 3.5 cc. of 38% aqueous formaldehyde. 0.1 g. of potassium bicarbonate is added and the mixture stirred at 35° C. for 1.5 hours during which time the solid product separates. The mixture is cooled, stirred for a short time, and the solid 2-ethyl-4-biphenylyl α-acetoxyacetamido-β-hydroxyethyl ketone collected, washed with water and dried. This product has the formula,

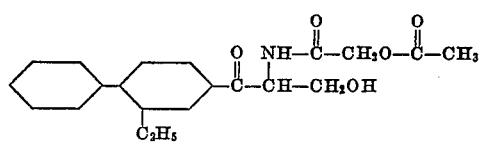

*Example 12*

29 g. of 4'-bromo-4-biphenylyl succinamidomethyl ketone is mixed with 250 cc. of absolute ethanol, 31 cc. of 38% aqueous formaldehyde. 0.8 g. of potassium bicarbonate and the mixture stirred at 35° C. for two hours during which time the solid product separates. The mixture is cooled and stirred for a short time and the solid 4'-bromo-4-biphenylyl α-succinamido-β-hydroxyethyl ketone collected, washed with water and dried. This product has the formula,

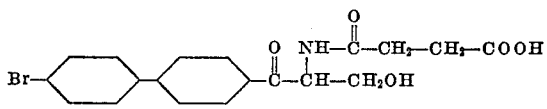

*Example 13*

A mixture consisting of 35 g. of 2',4'-dichloro-4-biphenylyl methoxypropionamidomethyl ketone, 1 g. of sodium bicarbonate, and 6 g. of paraformaldehyde in 300 cc. of methanol is warmed at 50° C. for one-half hour. The reaction mixture is allowed to stand for one hour and then poured into 1.5 liters of ice water. The precipitated product is collected, washed with water, and purified by recrystallization from ethyl acetate to obtain the pure 2',4'-dichloro-4-biphenylyl α-methoxypropionamido-β-hydroxyethyl ketone of the formula,

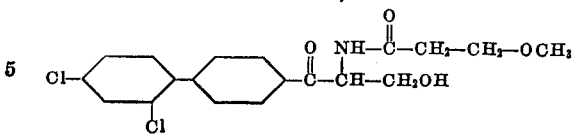

*Example 14*

7 g. of 4'-chloro-4-biphenylyl furamidomethyl ketone is mixed with 40 cc. of methanol, and 8 cc. of 40% neutral formalin. 0.3 g. of potassium bicarbonate is added and the mixture stirred at room temperature for about an hour during which time the solid product separates. The insoluble 4'-chloro-4-biphenylyl α-furamido-β-hydroxyethyl ketone of the formula,

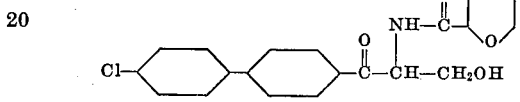

is collected and purified by recrystallization from ethyl acetate.

*Example 15*

62 g. of 4-biphenylyl nicotinamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4-biphenylyl α-nicotinamido-β-hydroxyethyl ketone is collected and purified by recrystallization from ethanol and has the formula,

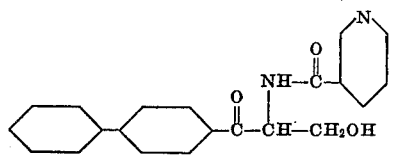

*Example 16*

6 g. of 4-biphenylyl crotonamidomethyl ketone is mixed with 35 cc. of methanol and 8 cc. of 40% neutral formalin. 0.3 g. of potassium bicarbonate is added and the mixture stirred at room temperature for about an hour. The solid product which separates is collected, purified by recrystallization from ethyl acetate and has the formula,

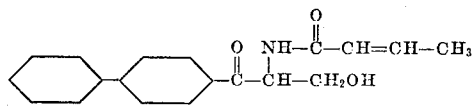

*Example 17*

A mixture consisting of 50 g. of 4-biphenylyl lactamidomethyl ketone, 300 cc. of ethanol and 75 cc. of 40% neutral formalin is treated with 2 g. of sodium bicarbonate. The mixture is stirred at 35° C. for about one and one-half hours and the insoluble 4-biphenylyl α-lactamido-β-hydroxyethyl ketone is collected. This product which has the formula,

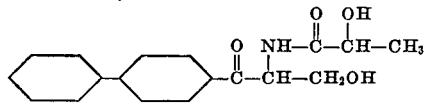

is washed with water and dried in vacuo.

*Example 18*

58 g. of 4-biphenylyl dichloroacetamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4-biphenylyl α-dichloroacetamido-β-hydroxyethyl ketone has formula,

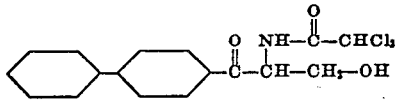

Example 19

62 g. of 4-biphenylyl benzamidomethyl ketone is mixed with 300 cc. of methanol and 75 cc. of 40% neutral formalin. 2 g. of sodium bicarbonate is added and the mixture stirred at room temperature for about an hour during which time the desired solid product separates. The insoluble 4-biphenylyl α-benzamido-β-hydroxyethyl ketone has formula,

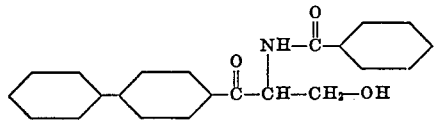

The biphenylyl acylamidomethyl ketone, used as the starting material in the practice of the invention, may be prepared by the method illustrated as follows:

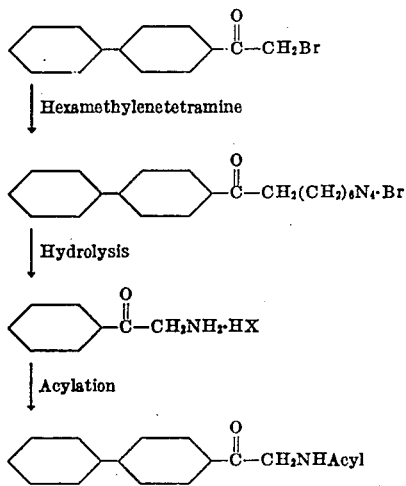

For example, the 4-biphenylyl acetamidomethyl ketone, used as the starting material in Example 1, is prepared as follows:

(a) 75 g. of hexamethylenetetramine dissolved in chloroform is added to 125 g. of 4-biphenylyl bromomethyl ketone and the mixture allowed to stand at room temperature for about three hours. The 4-biphenylyl bromomethyl ketone-hexamethylenetetramine complex is collected, washed with a little chloroform and dried. The formula of this product is,

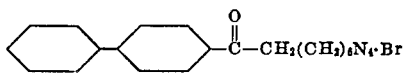

(b) 175 g. of the 4-biphenylyl bromomethyl ketone hexamethylenetetramine complex is added to 200 cc. of concentrated hydrochloric acid in 1 liter of absolute alcohol and the mixture stirred overnight. The insoluble hydrochloride salt of 4-biphenylyl aminomethyl ketone is collected by filtration, washed with a small amount of cold water and dried at room temperature. The formula of this product is,

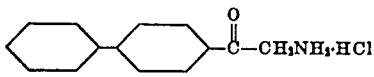

(c) The 4-biphenylyl aminomethyl ketone hydrochloride prepared in (b) is dissolved in 500 cc. of glacial acetic acid and 300 cc. of acetic anhydride. 150 g. of sodium acetate is added in small portions with stirring. After the addition has been completed the solution is diluted with water and the 4-biphenylyl acetamidomethyl ketone which separates collected and recrystallized from methanol; M. P. 154–5° C. The formula of this compound is,

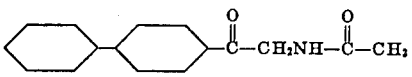

Some of the subject matter disclosed but not claimed herein is described and claimed in my copending applications Serial Nos. 136,831 and 136,832, both filed January 4, 1950, as continuations-in-part of my application Serial No. 83,778, now Patent No. 2,516,098.

What I claim is:

1. A compound of formula,

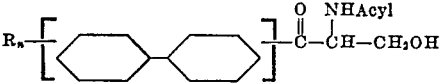

where $n$ is one of the integers 1 and 2 and R is a member of the class consisting of hydrogen, halogen, —NO₂, lower alkyl, and lower alkoxy radicals.

2. A compound of formula,

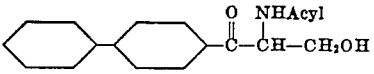

3. 4-biphenylyl α-acetamido-β-hydroxyethyl ketone.

4. 4-biphenylyl α-dichloroacetamido-β-hydroxyethyl ketone.

5. 4-biphenylyl α-benzamido-β-hydroxyethyl ketone.

6. A compound of formula,

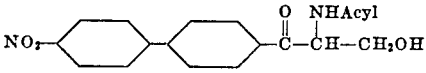

7. 4'-nitro-4-biphenylyl α-dichloroacetamido-β-hydroxyethyl ketone.

8. 4'-nitro-4-biphenylyl α-fluoroacetamido-β-hydroxyethyl ketone.

LOUIS L. BAMBAS.

No references cited.